US012628231B2

(12) United States Patent
Li

(10) Patent No.: US 12,628,231 B2
(45) Date of Patent: May 12, 2026

(54) BEAM RECOVERY METHOD AND APPARATUS, AND USER EQUIPMENT

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 327 days.

(21) Appl. No.: 18/284,512

(22) PCT Filed: Mar. 31, 2021

(86) PCT No.: PCT/CN2021/084608

§ 371 (c)(1),
(2) Date: Sep. 27, 2023

(87) PCT Pub. No.: WO2022/205146

PCT Pub. Date: Oct. 6, 2022

(65) Prior Publication Data

US 2024/0172313 A1      May 23, 2024

(51) Int. Cl.
| | |
|---|---|
| *H04W 76/19* | (2018.01) |
| *H04B 7/06* | (2006.01) |
| *H04L 5/00* | (2006.01) |
| *H04W 24/10* | (2009.01) |
| *H04W 76/20* | (2018.01) |

(52) U.S. Cl.
CPC ........ *H04W 76/19* (2018.02); *H04B 7/06968* (2023.05); *H04L 5/0051* (2013.01); *H04W 24/10* (2013.01); *H04W 76/20* (2018.02)

(58) Field of Classification Search
CPC .. H04W 76/19; H04W 24/10; H04B 7/06968; H04L 5/0051
See application file for complete search history.

(56) References Cited

U.S. PATENT DOCUMENTS

| | | |
|---|---|---|
| 2018/0234960 A1 | 8/2018 | Nagaraja et al. |
| 2018/0302889 A1 | 10/2018 | Guo et al. |
| 2019/0053288 A1* | 2/2019 | Zhou ................. H04W 74/0833 |

(Continued)

FOREIGN PATENT DOCUMENTS

| | | |
|---|---|---|
| CN | 108631845 A | 10/2018 |
| CN | 112398620 A | 2/2021 |
| WO | WO 2021/027413 A1 | 2/2021 |

OTHER PUBLICATIONS

European Patent Application No. 21933811.8 Search Report dated Apr. 4, 2024, 14 pages.

(Continued)

*Primary Examiner* — Derrick V Rose
(74) *Attorney, Agent, or Firm* — Cozen O'Connor

(57) ABSTRACT

A link recovery method includes obtaining a configuration signaling sent by a network side device; determining a target reference signal resource subset from the candidate beam reference signal set; and indicating identification information of the target reference signal resource subset to the network side device. The configuration signaling includes a candidate beam reference signal set. The candidate beam reference signal set includes at least one reference signal resource subset. The reference signal resource subset includes at least one reference signal resource.

19 Claims, 8 Drawing Sheets

(56)     References Cited

U.S. PATENT DOCUMENTS

| 2020/0382189 | A1 |  | 12/2020 | Chen et al. | |
| 2020/0389220 | A1 |  | 12/2020 | Kang et al. | |
| 2021/0067234 | A1 | * | 3/2021 | Guan | H04B 7/0695 |
| 2021/0337453 | A1 | * | 10/2021 | Gao | H04W 52/08 |
| 2022/0141814 | A1 |  | 5/2022 | Fan et al. | |
| 2023/0262820 | A1 | * | 8/2023 | Song | H04W 24/08 |
| | | | | | 370/329 |

OTHER PUBLICATIONS

VIVO, "Further discussion on MTRP multibeam enhancement" 3GPP TSG RAN WG1 #104-e; R1-2100424, Jan. 2021, 12 pages.

Huawei et al., "Discussion on multi-TRP for multi-panel reception in Rel-17", 3GPP TSG RAN WGI Meeting #103-e, RI-2007589, Oct. 2020, 6 pages.

Indian Patent Application No. 202347073743 Office Action dated Mar. 20, 2025, 6 pages.

PCT/CN2021/084608, International Search Report dated Dec. 31, 2021, 2 pages.

* cited by examiner

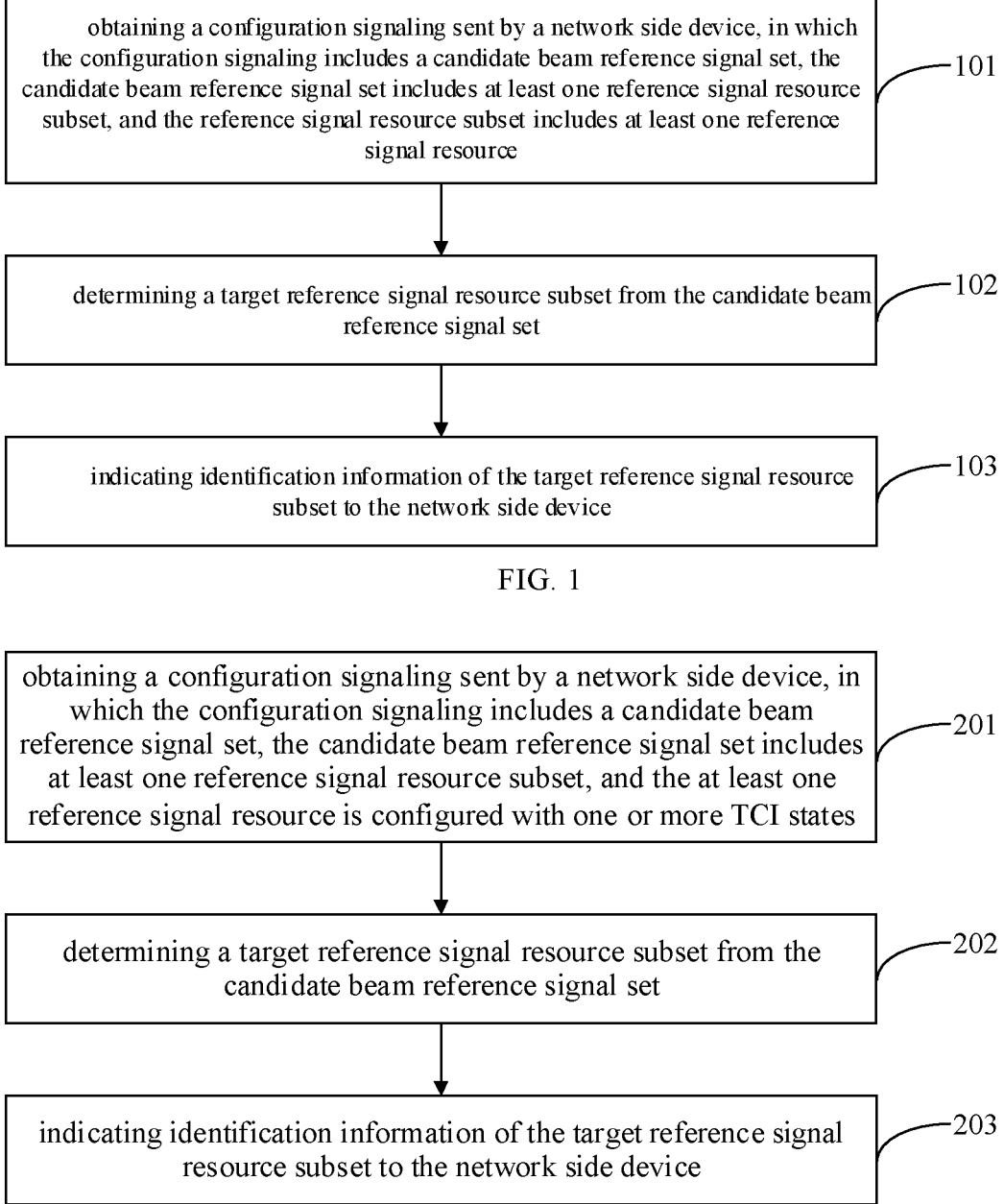

obtaining a configuration signaling sent by a network side device, in which the configuration signaling includes a candidate beam reference signal set, the candidate beam reference signal set includes at least one reference signal resource subset, and the reference signal resource subset includes at least one reference signal resource — 101 determining a target reference signal resource subset from the candidate beam reference signal set — 102 indicating identification information of the target reference signal resource subset to the network side device — 103

FIG. 1 obtaining a configuration signaling sent by a network side device, in which the configuration signaling includes a candidate beam reference signal set, the candidate beam reference signal set includes at least one reference signal resource subset, and the at least one reference signal resource is configured with one or more TCI states — 201 determining a target reference signal resource subset from the candidate beam reference signal set — 202 indicating identification information of the target reference signal resource subset to the network side device — 203

FIG. 2

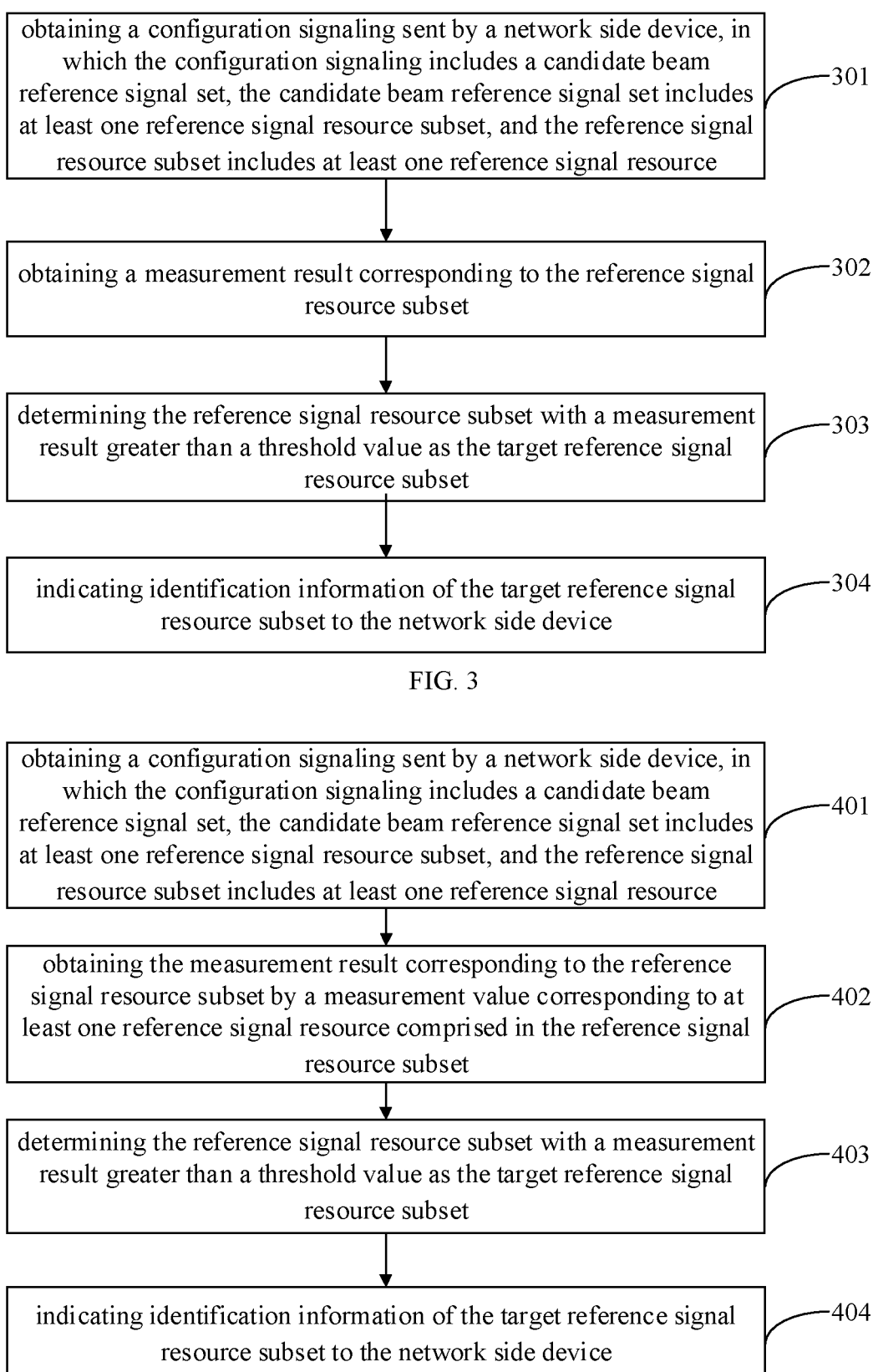

obtaining a configuration signaling sent by a network side device, in which the configuration signaling includes a candidate beam reference signal set, the candidate beam reference signal set includes at least one reference signal resource subset, and the reference signal resource subset includes at least one reference signal — 301 obtaining a measurement result corresponding to the reference signal resource subset — 302 determining the reference signal resource subset with a measurement result greater than a threshold value as the target reference signal resource subset — 303 indicating identification information of the target reference signal resource subset to the network side device — 304

FIG. 3 obtaining a configuration signaling sent by a network side device, in which the configuration signaling includes a candidate beam reference signal set, the candidate beam reference signal set includes at least one reference signal resource subset, and the reference signal resource subset includes at least one reference signal — 401 obtaining the measurement result corresponding to the reference signal resource subset by a measurement value corresponding to at least one reference signal resource comprised in the reference signal resource subset — 402 determining the reference signal resource subset with a measurement result greater than a threshold value as the target reference signal resource subset — 403 indicating identification information of the target reference signal resource subset to the network side device — 404

FIG. 4

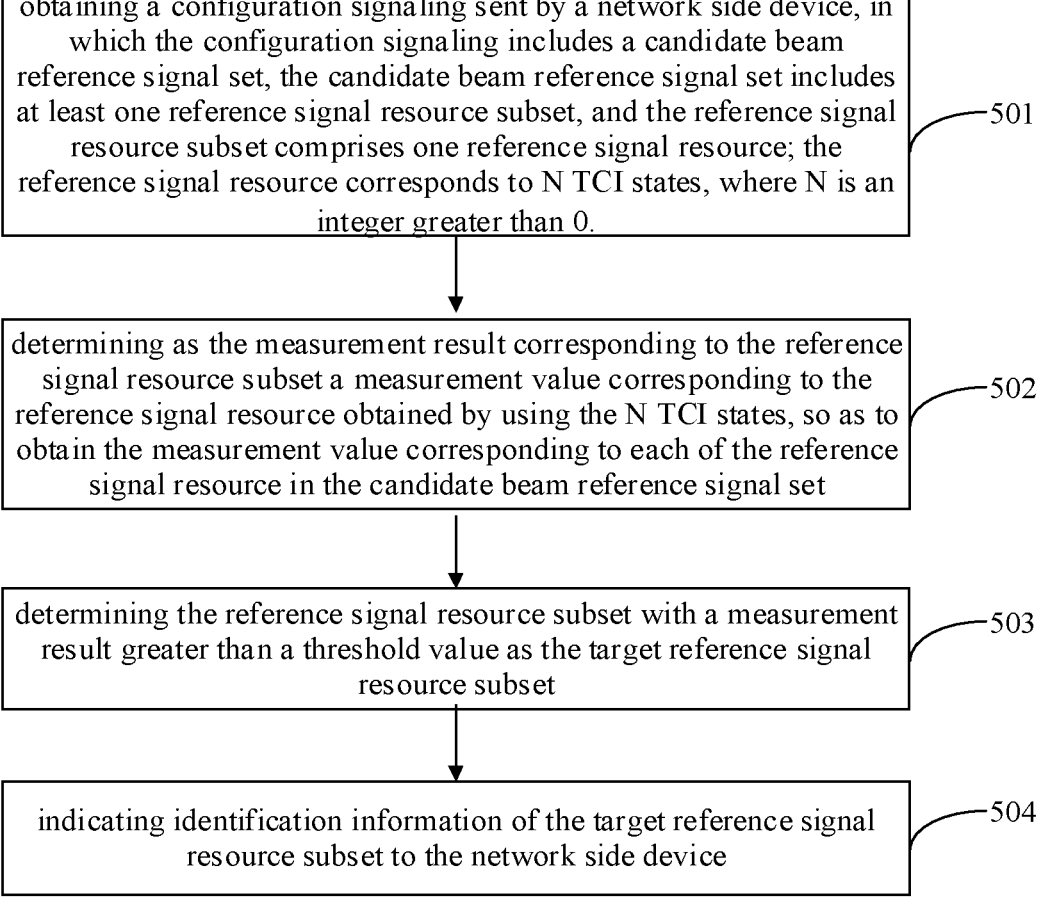

obtaining a configuration signaling sent by a network side device, in which the configuration signaling includes a candidate beam reference signal set, the candidate beam reference signal set includes at least one reference signal resource subset, and the reference signal resource subset comprises one reference signal resource; the reference signal resource corresponds to N TCI states, where N is an integer greater than 0. ⌒501 determining as the measurement result corresponding to the reference signal resource subset a measurement value corresponding to the reference signal resource obtained by using the N TCI states, so as to obtain the measurement value corresponding to each of the reference signal resource in the candidate beam reference signal set ⌒502 determining the reference signal resource subset with a measurement result greater than a threshold value as the target reference signal resource subset ⌒503 indicating identification information of the target reference signal resource subset to the network side device ⌒504

FIG. 5

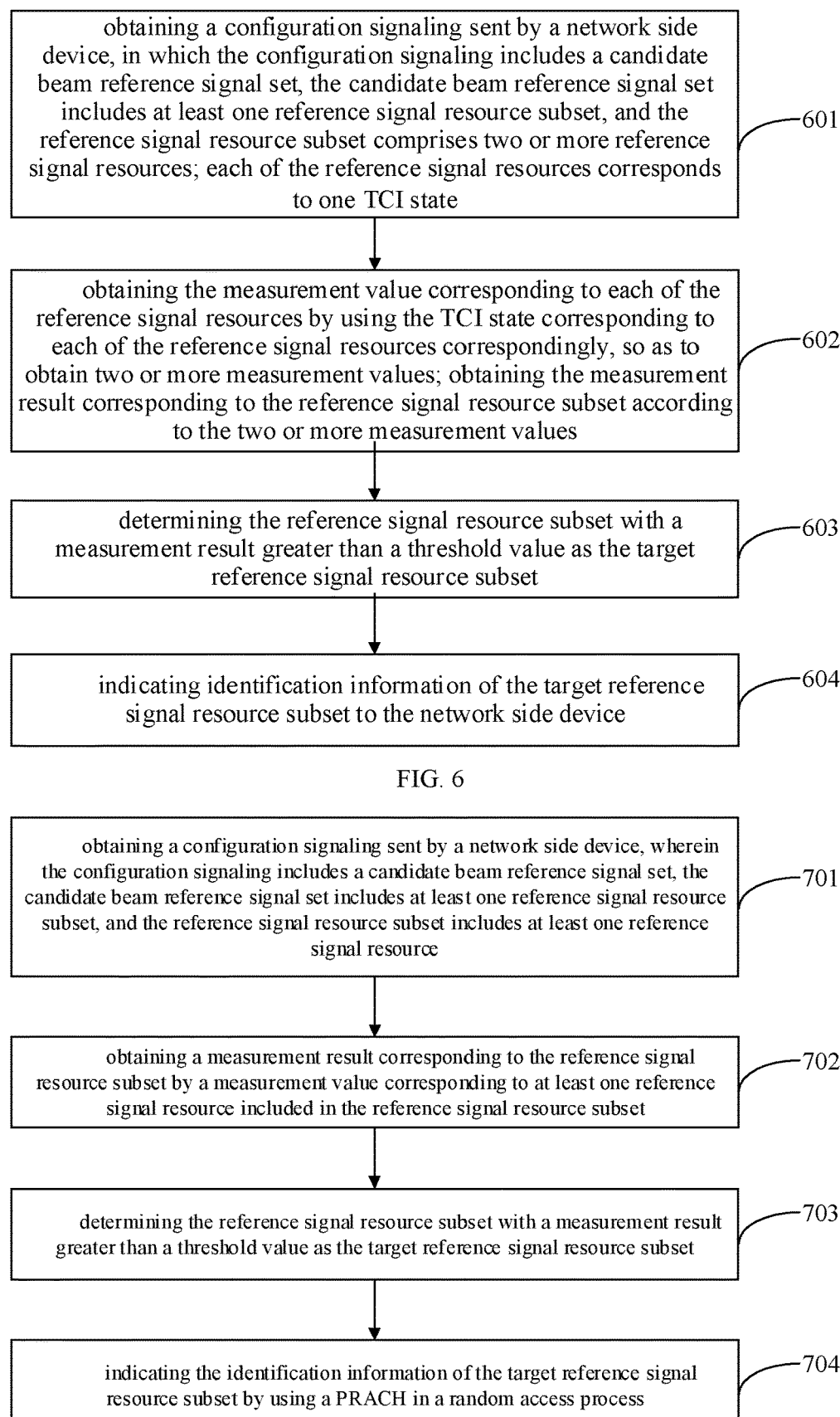

obtaining a configuration signaling sent by a network side device, in which the configuration signaling includes a candidate beam reference signal set, the candidate beam reference signal set includes at least one reference signal resource subset, and the reference signal resource subset comprises two or more reference signal resources; each of the reference signal resources corresponds to one TCI state — 601 obtaining the measurement value corresponding to each of the reference signal resources by using the TCI state corresponding to each of the reference signal resources correspondingly, so as to obtain two or more measurement values; obtaining the measurement result corresponding to the reference signal resource subset according to the two or more measurement values — 602 determining the reference signal resource subset with a measurement result greater than a threshold value as the target reference signal resource subset — 603 indicating identification information of the target reference signal resource subset to the network side device — 604

FIG. 6 obtaining a configuration signaling sent by a network side device, wherein the configuration signaling includes a candidate beam reference signal set, the candidate beam reference signal set includes at least one reference signal resource subset, and the reference signal resource subset includes at least one reference signal resource — 701 obtaining a measurement result corresponding to the reference signal resource subset by a measurement value corresponding to at least one reference signal resource included in the reference signal resource subset — 702 determining the reference signal resource subset with a measurement result greater than a threshold value as the target reference signal resource subset — 703 indicating the identification information of the target reference signal resource subset by using a PRACH in a random access process — 704

FIG. 7

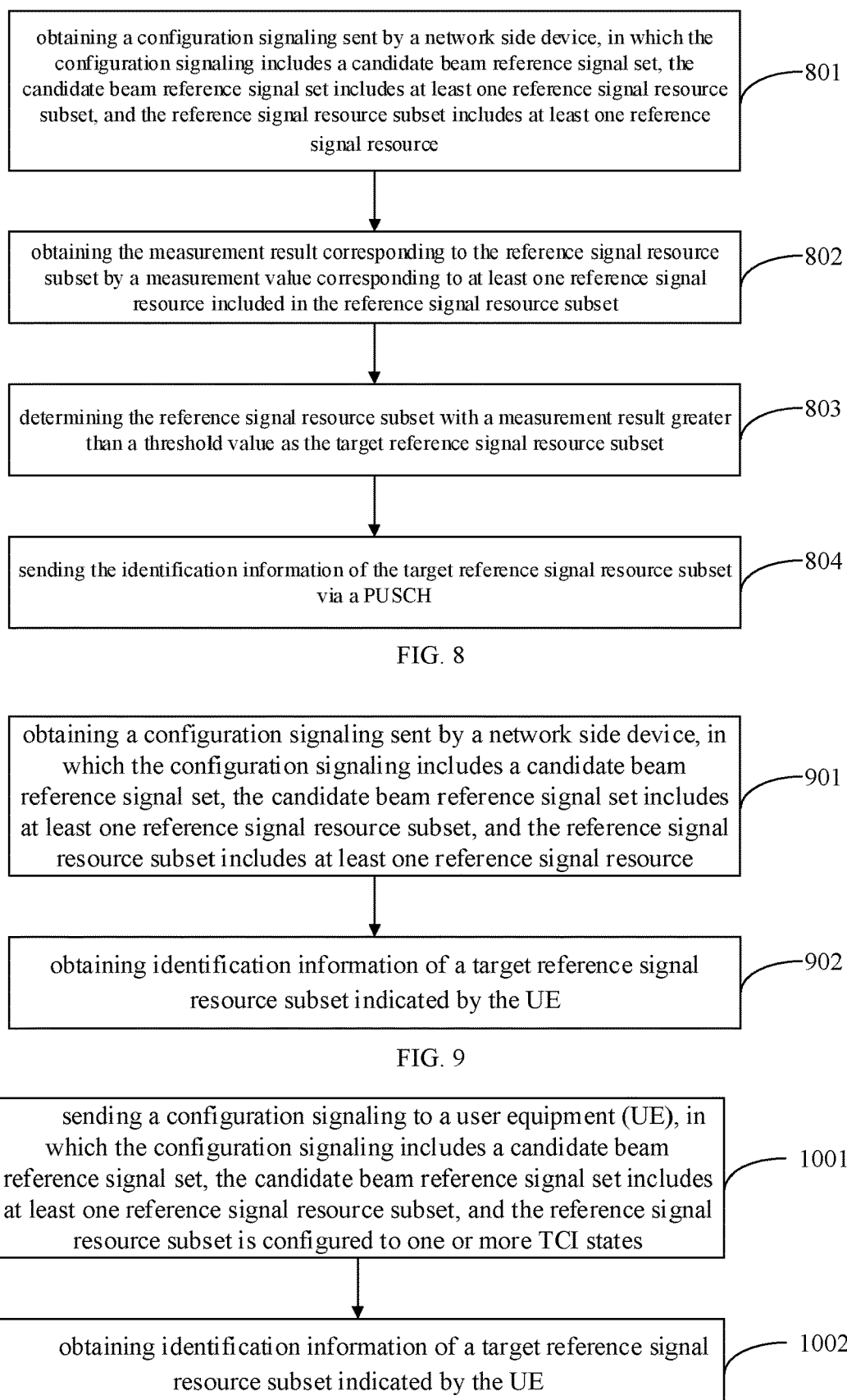

obtaining a configuration signaling sent by a network side device, in which the configuration signaling includes a candidate beam reference signal set, the candidate beam reference signal set includes at least one reference signal resource subset, and the reference signal resource subset includes at least one reference signal resource — 801 obtaining the measurement result corresponding to the reference signal resource subset by a measurement value corresponding to at least one reference signal resource included in the reference signal resource subset — 802 determining the reference signal resource subset with a measurement result greater than a threshold value as the target reference signal resource subset — 803 sending the identification information of the target reference signal resource subset via a PUSCH — 804

FIG. 8 obtaining a configuration signaling sent by a network side device, in which the configuration signaling includes a candidate beam reference signal set, the candidate beam reference signal set includes at least one reference signal resource subset, and the reference signal resource subset includes at least one reference signal resource — 901 obtaining identification information of a target reference signal resource subset indicated by the UE — 902

FIG. 9 sending a configuration signaling to a user equipment (UE), in which the configuration signaling includes a candidate beam reference signal set, the candidate beam reference signal set includes at least one reference signal resource subset, and the reference signal resource subset is configured to one or more TCI states — 1001 obtaining identification information of a target reference signal resource subset indicated by the UE — 1002

FIG. 10

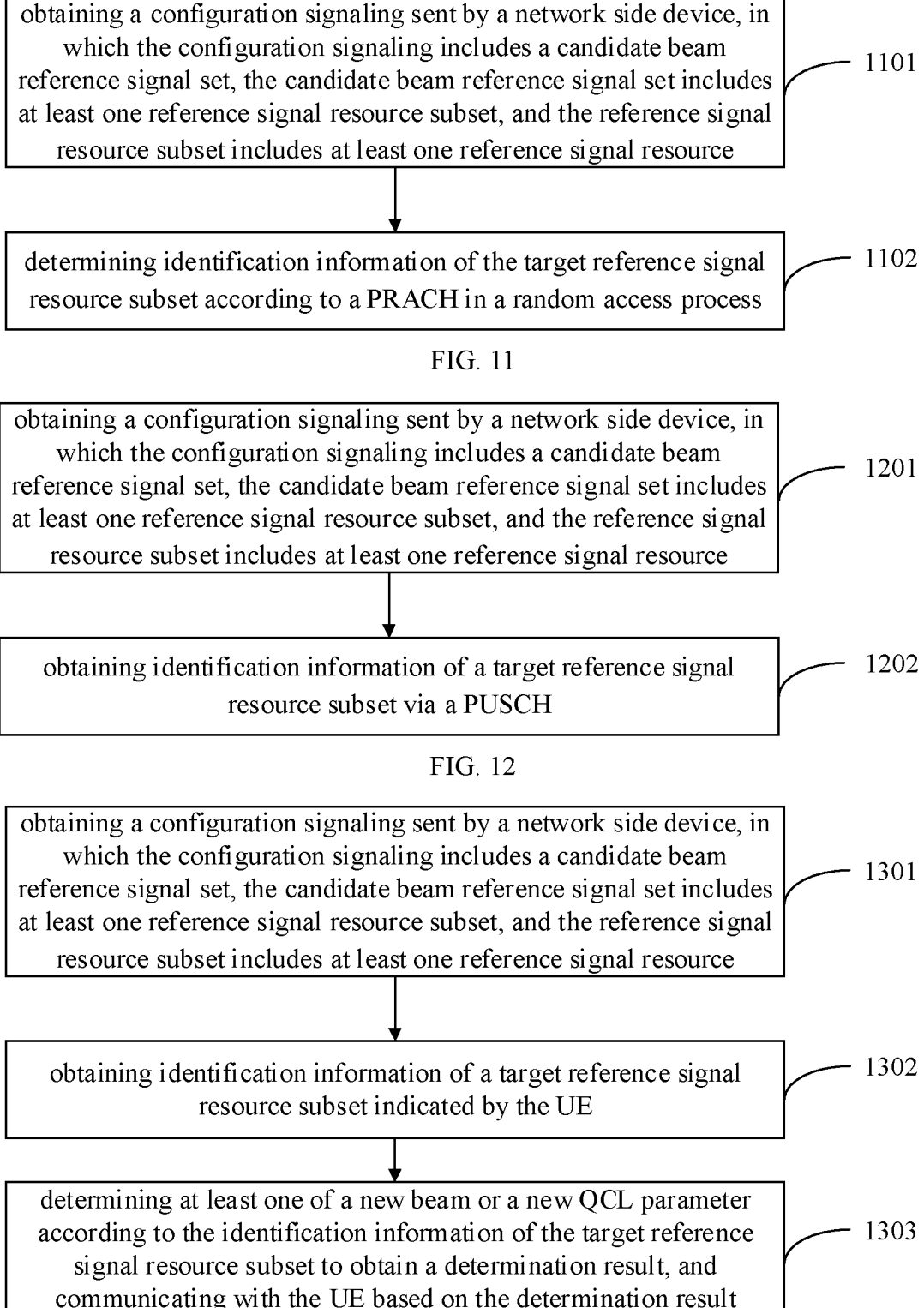

obtaining a configuration signaling sent by a network side device, in which the configuration signaling includes a candidate beam reference signal set, the candidate beam reference signal set includes at least one reference signal resource subset, and the reference signal resource subset includes at least one reference signal resource — 1101 determining identification information of the target reference signal resource subset according to a PRACH in a random access process — 1102

FIG. 11 obtaining a configuration signaling sent by a network side device, in which the configuration signaling includes a candidate beam reference signal set, the candidate beam reference signal set includes at least one reference signal resource subset, and the reference signal resource subset includes at least one reference signal resource — 1201 obtaining identification information of a target reference signal resource subset via a PUSCH — 1202

FIG. 12 obtaining a configuration signaling sent by a network side device, in which the configuration signaling includes a candidate beam reference signal set, the candidate beam reference signal set includes at least one reference signal resource subset, and the reference signal resource subset includes at least one reference signal resource — 1301 obtaining identification information of a target reference signal resource subset indicated by the UE — 1302 determining at least one of a new beam or a new QCL parameter according to the identification information of the target reference signal resource subset to obtain a determination result, and communicating with the UE based on the determination result — 1303

FIG. 13

BEAM RECOVERY METHOD AND APPARATUS, AND USER EQUIPMENT

CROSS-REFERENCE TO RELATED APPLICATIONS

The present application is a national phase entry of International Application No. PCT/CN2021/084608, filed Mar. 31, 2021, the entire contents of which are incorporated herein by reference.

TECHNICAL FIELD

The present disclosure relates to a communication technical field, and more particularly, to a link recovery method, a link recovery apparatus, a user equipment, a network side device, and a storage medium.

BACKGROUND

In a new radio (NR) communication system, it is generally required to transmit and receive data based on beams to ensure coverage and resist path loss. In addition, in a Rel-17 protocol, due to introduction of a physical downlink control channel (PDCCH) of multi-TRP, a plurality of beams may be used to send the same signal, such as downlink control information (DCI).

When the plurality of beams is used to send the same signaling, if a user equipment (UE) moves or an antenna direction rotates, beam failure will occur in the beam currently configured for the UE for sending and receiving. At present, a beam failure recovery request needs to be sent to a network side device to perform link recovery.

SUMMARY

The present disclosure provides a link recovery method, a link recovery apparatus, a user equipment, a network side device, and a storage medium, which are used to improve a success rate of link recovery and reduce delay of the link recovery.

According to an aspect of the present disclosure, a link recovery method is provided, which is performed by a user equipment (UE) and includes:

obtaining a configuration signaling sent by a network side device, wherein the configuration signaling includes a candidate beam reference signal set, the candidate beam reference signal set includes at least one reference signal resource subset, and the reference signal resource subset includes at least one reference signal resource;

determining a target reference signal resource subset from the candidate beam reference signal set;

indicating identification information of the target reference signal resource subset to the network side device.

According to another aspect of the present disclosure, a link recovery method is provided, which is performed by a network side device and includes:

sending a configuration signaling to a user equipment (UE), wherein the configuration signaling includes a candidate beam reference signal set, the candidate beam reference signal set includes at least one reference signal resource subset, and the reference signal resource subset includes at least one reference signal resource;

obtaining identification information of a target reference signal resource subset indicated by the UE.

According to another aspect of the present disclosure, a user equipment is provided, which includes: a transceiver; a memory; a processor connected to the transceiver and the memory respectively and configured to control transmission and reception of a wireless signal of the transceiver and implement the method according to any one of the above-mentioned embodiment, by executing computer-executable instructions on the memory.

According to another aspect of the present disclosure, a network side device is provided, which includes: a transceiver; a memory; a processor connected to the transceiver and the memory respectively and configured to control transmission and reception of a wireless signal of the transceiver and implement the method according to any one of the above-mentioned embodiment, by executing computer-executable instructions on the memory.

According to another aspect of the present disclosure, a computer storage medium is provided, which has stored therein computer-executable instructions that, after executed by a processor, cause the method according to any one of the above-mentioned embodiment.

Additional aspects and advantages of the present disclosure will be set forth in part in the description which follows, and in part will be obvious from the description, or may be learned by practice of the present disclosure.

BRIEF DESCRIPTION OF THE DRAWINGS

The above and/or additional aspects and advantages of the present disclosure will become apparent and readily understood from the following description of embodiments in conjunction with the accompanying drawings, in which:

FIG. 1 is a schematic flowchart of a link recovery method provided by an embodiment of the present disclosure;

FIG. 2 is a schematic flowchart of a link recovery method provided by another embodiment of the present disclosure;

FIG. 3 is a schematic flowchart of a link recovery method provided by another embodiment of the present disclosure;

FIG. 4 is a schematic flowchart of a link recovery method provided by another embodiment of the present disclosure;

FIG. 5 is a schematic flowchart of a link recovery method provided by another embodiment of the present disclosure;

FIG. 6 is a schematic flowchart of a link recovery method provided by another embodiment of the present disclosure;

FIG. 7 is a schematic flowchart of a link recovery method provided by another embodiment of the present disclosure;

FIG. 8 is a schematic flowchart of a link recovery method provided by another embodiment of the present disclosure;

FIG. 9 is a schematic flowchart of a link recovery method provided by another embodiment of the present disclosure;

FIG. 10 is a schematic flowchart of a link recovery method provided by another embodiment of the present disclosure;

FIG. 11 is a schematic flowchart of a link recovery method provided by another embodiment of the present disclosure;

FIG. 12 is a schematic flowchart of a link recovery method provided by another embodiment of the present disclosure;

FIG. 13 is a schematic flowchart of a link recovery method provided by another embodiment of the present disclosure;

DETAILED DESCRIPTION

Figures 14, 15:
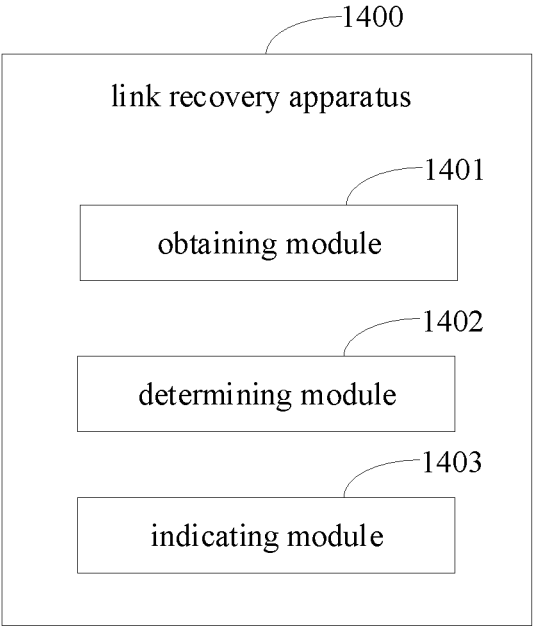
FIG. 14 is a schematic diagram of a link recovery apparatus provided by an embodiment of the present disclosure.
FIG. 15 is a schematic diagram of a link recovery apparatus provided by another embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims, "a/an" and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly second information may also be called first information. Depending on the context, the word "if" as used herein may be interpreted as "upon" or "when" or "in response to determining".

Embodiments of the present disclosure are described in detail below, examples of which are illustrated in the accompanying drawings, wherein the same or similar reference numerals refer to the same or similar elements throughout. Embodiments described below with reference to the accompanying drawings are illustrative and intended to explain the present disclosure and are not to be construed as limitations of the present disclosure.

In a link recovery method provided by embodiments of the present disclosure, the user equipment obtains a configuration signaling sent by a network side device. The configuration signaling includes a candidate beam reference signal set, and the candidate beam reference signal set includes at least one reference signal resource subset, and the reference signal resource subset includes at least one reference signal resource. Afterwards, the user equipment determines a target reference signal resource subset from the candidate beam reference signal set, and indicates identification information of the target reference signal resource subset to the network side device, so that the network side device may determine at least one new beam according to at least one reference signal resource included in the target reference signal resource subset to achieve link recovery. It could be seen that the link recovery method provided in embodiments of the present disclosure may determine one or more new beams to achieve link recovery, and thus is applied to multi-TRP scenarios, which may improve a success rate of link recovery and reduce delay of the link recovery.

A link recovery method, a link recovery apparatus, a user equipment, a network side device and a storage medium provided by the present disclosure will be described in detail below with reference to the accompanying drawings.

FIG. 1 is a schematic flowchart of a link recovery method provided by an embodiment of the present disclosure, which is applied to a user equipment. As shown in FIG. 1, the link recovery method may include the following steps.

In step 101, configuration signaling sent by a network side device is obtained. The configuration signaling includes a candidate beam reference signal set, the candidate beam reference signal set includes at least one reference signal resource subset, and the reference signal resource subset includes at least one reference signal resource.

It is noted that the link recovery method in embodiments of the present disclosure may be applied to any user equipment (UE). The UE may be a device that provides voice and/or data connectivity to users. The UE may communicate with one or more core networks via a radio access network (RAN), and the UE may be an Internet of Things (IoT) terminal, such as a sensor device, a mobile phone (or called a cellular phone) and computers with an IoT terminal. For example, the UE may be fixed, portable, pocket, hand-held, computer built-in or vehicle-mounted devices. For example, the UE may be a station (STA), a subscriber unit, a subscriber station, a mobile station, a mobile, a remote station, an access point, a remote terminal, an access terminal, a user terminal or a user agent. Alternatively, the UE may also be a device of an unmanned aerial vehicle. Alternatively, the UE may also be a vehicle-mounted device, for example, a trip computer with a wireless communication function, or a wireless terminal externally connected to the trip computer. Alternatively, the UE may also be a roadside device, for example, may be a street lamp, a signal light, or other roadside devices with a wireless communication function.

In addition, the network side device in embodiments of the present disclosure may be, for example, a base station.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In an embodiment of the present disclosure, the reference signal resource subset may include one reference signal resource. When the reference signal resource subset only includes one reference signal resource, the reference signal resource subset may be considered to be the same as the reference signal resource, that is, the candidate reference signal resource set may include at least one reference signal resource.

In another embodiment of the present disclosure, the reference signal resource subset may include a plurality of reference signal resources. The plurality of reference signal resources have a certain relationship. For example, the plurality of reference signal resources belong to one reference signal resource subset, or the plurality of reference signal resources are configured as the plurality of reference signal resources with an associated relationship. The association relationship includes, is are not limited to, a pair relationship, a group relationship, or a link relationship.

In step 102, a target reference signal resource subset is determined from the candidate beam reference signal set.

In an embodiment of the present disclosure, one or more target reference signal resource subsets may be determined from one candidate beam reference signal set.

In an embodiment of the present disclosure, when the reference signal resource subset includes one reference signal resource, determining the target reference signal resource subset from the candidate beam reference signal set may be replaced by determining a target reference signal resource from the candidate beam reference signal set.

In another embodiment of the present disclosure, when the reference signal resource subset includes a plurality of reference signal resources, determining the target reference signal resource subset from the candidate beam reference signal set may be replaced by determining at least one target reference signal resource in the target reference signal resources subset from the candidate beam reference signal set.

In an embodiment of the present disclosure, the target reference signal resource subset may be determined from the candidate beam reference signal set based on a measurement result of the reference signal resource subset. For example, in an embodiment of the present disclosure, the reference signal resource subset with a measurement result greater than a threshold value may be determined as the target reference signal resource subset.

Further, in an embodiment of the present disclosure, the measurement result of the reference signal resource subset may be determined according to the measurement value corresponding to at least one reference signal resource included in the reference signal resource subset. In an embodiment of the present disclosure, the measurement value may include: radio link quality, reference signal received power (RSRP), reference signal received quality (RSRQ) and/or signal to interference plus noise ratio (SINR), etc. The RSRP may be a measurement value of layer 1 (L1) or layer 3 (L3), the RSRQ may also be the measurement value of L1 or L3, and the SINR may also be the measurement value of L1 or L3.

In step 103, identification information of the target reference signal resource subset is indicated to the network side device.

In an embodiment of the present disclosure, when the reference signal resource subset includes one reference signal resource, the identification information of the target reference signal resource subset may be an index of the target reference signal resource subset, or an index of the target reference signal resource included in the target reference signal resource sub set.

In another embodiment of the present disclosure, when the reference signal resource subset includes the plurality of reference signal resources, the identification information of the target reference signal resource subset may be the index corresponding to the target reference signal resource subset.

In another embodiment of the present disclosure, when the reference signal resource subset includes the plurality of reference signal resources, the identification information of the target reference signal resource subset may be the index corresponding to at least one reference signal resource in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the link recovery, and reduces the delay of the beam link recovery.

FIG. 2 is a schematic flowchart of a link recovery method provided by an embodiment of the present disclosure, which is applied to a user equipment. As shown in FIG. 2, the link recovery method may include the following steps.

In step 201, a configuration signaling sent by a network side device is obtained. The configuration signaling may include a candidate beam reference signal set, and the candidate reference signal resource set may include at least one reference signal resource, and the at least one reference signal resource is configured with one or more TCI states.

It is noted that the link recovery method in embodiments of the present disclosure may be applied to any user equipment (UE). The UE may be a device that provides voice and/or data connectivity to users. The UE may communicate with one or more core networks via a radio access network (RAN), and the UE may be an Internet of Things (IoT) terminal, such as a sensor device, a mobile phone (or called a cellular phone) and computers with an IoT terminal. For example, the UE may be fixed, portable, pocket, hand-held, computer built-in or vehicle-mounted devices. For example, the UE may be a station (STA), a subscriber unit, a subscriber station, a mobile station, a mobile, a remote station, an access point, a remote terminal, an access terminal, a user terminal or a user agent. Alternatively, the UE may also be a device of an unmanned aerial vehicle. Alternatively, the UE may also be a vehicle-mounted device, for example, a trip computer with a wireless communication function, or a wireless terminal externally connected to the trip computer. Alternatively, the UE may also be a roadside device, for example, may be a street lamp, a signal light, or other roadside devices with a wireless communication function.

In addition, the network side device in embodiments of the present disclosure may be, for example, a base station.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 202, a target reference signal resource is determined from the candidate beam reference signal set.

In an embodiment of the present disclosure, one or more target reference signal resources may be determined from one candidate beam reference signal set.

In an embodiment of the present disclosure, the target reference signal resource may be determined from the candidate beam reference signal set based on the measurement result of the reference signal resource. For example, in an embodiment of the present disclosure, a reference signal resource with a measurement result greater than a threshold value may be determined as the target reference signal resource.

Further, in an embodiment of the present disclosure, the measurement result of one reference signal resource may be determined based on the measurement value corresponding to the reference signal resource. In an embodiment of the present disclosure, the measurement value may include: radio link quality and/or RSRP and/or RSRQ and/or SINR, etc. The RSRP may be a measurement value of layer 1 (L1) or layer (L3), the RSRQ may also be a measurement value of L1 or L3, and the SINR may also be a measurement value of L1 or L3.

Further, in an embodiment of the present disclosure, one reference signal resource may be configured with only one TCI state, and the measurement result corresponding to the reference signal resource may be obtained based on the quasi co-location (QCL) information corresponding to the one TCI state.

In another embodiment of the present disclosure, one reference signal resource may be configured with a plurality of TCI states. The measurement result corresponding to the reference signal resource may be obtained based on the QCL information corresponding to the plurality of TCI states. The plurality of TCI states may be at least two TCI states.

In step 203, identification information of the target reference signal resource is indicated to the network side device.

In an embodiment of the present disclosure, the identification information of the target reference signal resource may be an index corresponding to the target reference signal resource.

In addition, in an embodiment of the present disclosure, after the UE indicates the identification information of the target reference signal resource to the network side device, the network side device determines at least one new beam according to the target reference signal resource, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resources sent by the UE to achieve link recovery, and thus may be applied to multi-TRP scenarios, which has a wide range of applications, improves the success rate of the beam link recovery and reduces the delay of the beam link recovery.

FIG. 3 is a schematic flowchart of a link recovery method provided by another embodiment of the present disclosure, which is applied to a user equipment. As shown in FIG. 3, the link recovery method may include the following steps.

In step 301, a configuration signaling sent by a network side device is obtained. The configuration signaling includes a candidate beam reference signal set, the candidate beam reference signal set includes at least one reference signal resource subset, and the reference signal resource subset includes at least one reference signal resource.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 302, a measurement result corresponding to the reference signal resource subset is obtained.

In an embodiment of the present disclosure, the measurement result corresponding to each reference signal resource subset in the candidate beam reference signal set may be determined.

In an embodiment of the present disclosure, the measurement result corresponding to a certain reference signal resource subset may be obtained through the measurement value corresponding to at least one reference signal resource included in the reference signal resource sub set.

In an embodiment of the present disclosure, the measurement value corresponding to the reference signal resource may include: radio link quality and/or RSRP and/or RSRQ and/or SINR, etc. The RSRP may be a measurement value of layer 1 (L1) or layer 3 (L3), the RSRQ may also be a measurement value of L1 or L3, and the SINR may also be a measurement value of L1 or L3.

In step 303, the reference signal resource subset with a measurement result greater than a threshold value is determined as a target reference signal resource subset.

In an embodiment of the present disclosure, the threshold value may be predetermined by the UE.

In another embodiment of the present disclosure, the threshold value may be indicated by the network side device to the UE.

In an embodiment of the present disclosure, one or more target reference signal resource subsets may be determined from one candidate beam reference signal set.

In step 304, identification information of the target reference signal resource subset is indicated to the network side device.

In an embodiment of the present disclosure, when the reference signal resource subset includes one reference signal resource, the identification information of the target reference signal resource subset may be an index of the target reference signal resource subset, or an index of the target reference signal resource included in the target reference signal resource sub set.

In another embodiment of the present disclosure, when the reference signal resource subset includes a plurality of reference signal resources, the identification information of the target reference signal resource subset may be the index corresponding to the target reference signal resource subset.

In another embodiment of the present disclosure, when the reference signal resource subset includes a plurality of reference signal resources, the identification information of the target reference signal resource subset may be the index corresponding to at least one reference signal resource in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 4 is a schematic flowchart of a link recovery method provided by another embodiment of the present disclosure, which is applied to a user equipment. As shown in FIG. 4, the link recovery method may include the following steps.

In step 401, a configuration signaling sent by the network side device is obtained. The configuration signaling includes a candidate beam reference signal set, the candidate beam reference signal set includes at least one reference signal resource subset, and the reference signal resource subset includes at least one reference signal resource.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 402, a measurement result corresponding to the reference signal resource subset is obtained by a measurement value corresponding to at least one reference signal resource included in the reference signal resource subset.

In an embodiment of the present disclosure, the measurement result corresponding to each reference signal resource subset in the candidate beam reference signal set may be determined.

In an embodiment of the present disclosure, the measurement result corresponding to a certain reference signal resource subset may be obtained by the measurement value corresponding to at least one reference signal resource included in the reference signal resource sub set.

In an embodiment of the present disclosure, the measurement value corresponding to the reference signal resource may include: radio link quality and/or RSRP and/or RSRQ and/or SINR, etc. The RSRP may be a measurement value of a layer 1 (L1) or a layer 3 (L3), the RSRQ may also be a measurement value of L1 or L3, and the SINR may also be a measurement value of L1 or L3.

When the measurement values corresponding to the reference signal resources are different, the measurement results corresponding to the reference signal resource subsets are obtained in different ways.

Specifically, in an embodiment of the present disclosure, when the measurement value corresponding to the reference signal resource includes radio link quality, determining the measurement result of the reference signal resource subset according to the measurement value corresponding to at least one reference signal resource included in the reference signal resource subset may include: when the reference signal resource subset includes only one reference signal resource, directly determining the measurement value corresponding to the one reference signal resource as the measurement result corresponding to the reference signal resource subset; when the reference signal resource subset includes two or more reference signal resources, summing the reference signal power measurement values corresponding to the two or more reference signal resources, and considering the interference part other than the two or more reference signal resources, so as to obtain the measurement results of the reference signal resource subset.

In another embodiment of the present disclosure, when the measurement value corresponding to the reference signal resource includes the RSRP, determining the measurement result of the reference signal resource subset according to the measurement value corresponding to at least one reference signal resource included in the reference signal resource subset may include: when the reference signal resource subset includes only one reference signal resource, directly determining the measurement value corresponding to the one reference signal resource as the measurement result corresponding to the reference signal resource subset; when the reference signal resource subset includes two or more reference signal resources, summing the measurement values corresponding to the two or more reference signal resources to obtain the measurement result of the reference signal resource subset.

In another embodiment of the present disclosure, when the measurement value corresponding to the reference signal resource includes the RSRQ, determining the measurement result of the reference signal resource subset according to the measurement value corresponding to at least one reference signal resource included in the reference signal resource subset may include: when the reference signal resource subset includes only one reference signal resource, directly determining the measurement value corresponding to the one reference signal resource as the measurement result corresponding to the reference signal resource subset; when the reference signal resource subset includes two or more reference signal resources, summing the reference signal power measurement values corresponding to the two or more reference signal resources, and considering the interference part other than the two or more reference signal resources to obtain the measurement results of the reference signal resource subset.

In another embodiment of the present disclosure, when the measurement value corresponding to the reference signal resource includes the SINR, determining the measurement result of the reference signal resource subset according to the measurement value corresponding to at least one reference signal resource included in the reference signal resource subset may include: when the reference signal resource subset includes only one reference signal resource, directly determining the measurement value corresponding to the one reference signal resource as the measurement result corresponding to the reference signal resource subset; when the reference signal resource subset includes two or more reference signal resources, summing the reference signal power measurement values corresponding to the two or more reference signal resources, and considering the interference part other than the two or more reference signal resources to obtain the measurement results of the reference signal resources subset.

In step 403, a reference signal resource subset with a measurement result greater than a threshold value is determined as a target reference signal resource subset.

In an embodiment of the present disclosure, the threshold value may be predetermined by the UE.

In another embodiment of the present disclosure, the threshold value may be indicated by the network side device to the UE.

In an embodiment of the present disclosure, one or more target reference signal resource subsets may be determined from one candidate beam reference signal set.

In step 404, identification information of the target reference signal resource subset is indicated to the network side device.

In an embodiment of the present disclosure, when the reference signal resource subset includes one reference signal resource, the identification information of the target reference signal resource subset may be an index of the target reference signal resource subset, or an index of one target reference signal resource included in the target reference signal resource sub set.

In another embodiment of the present disclosure, when the reference signal resource subset includes a plurality of reference signal resources, the identification information of the target reference signal resource subset may be the index corresponding to the target reference signal resource subset.

In another embodiment of the present disclosure, when the reference signal resource subset includes a plurality of reference signal resources, the identification information of the target reference signal resource subset may be the index corresponding to at least one reference signal resource in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 5 is a schematic flowchart of a link recovery method provided by another embodiment of the present disclosure, which is applied to a user equipment. As shown in FIG. 5, the link recovery method may include the following steps.

In step 501, a configuration signaling sent by the network side device is obtained. The configuration signaling includes a candidate beam reference signal set, the candidate beam reference signal set includes at least one reference signal resource subset, and the reference signal resource subset only includes one reference signal resource. The reference signal resource corresponds to N transmission configuration indication (TCI) states, where N is an integer greater than 0.

It is noted that when a certain reference signal resource subset only includes one reference signal resource, the one reference signal resource may correspond to one or more TCI states. That is, the one reference signal resource corresponds to N TCI states, and N is an integer greater than 0.

In step 502, a measurement value corresponding to the reference signal resource is obtained by using the N TCI states, and the measurement value is determined as the measurement result corresponding to the reference signal resource subset, thereby obtaining the measurement value corresponding to each reference signal resource subset in the candidate beam reference signal set.

This step 502 is mainly used to determine the measurement result of the reference signal resource subset including one reference signal resource.

In an embodiment of the present disclosure, the measurement value corresponding to the reference signal resource may include: radio link quality and/or RSRP and/or RSRQ and/or SINR, etc.

In an embodiment of the present disclosure, a process for determining the measurement result of the reference signal resource subset including one reference signal resource may include: using the N TCI states corresponding to the one reference signal resource to obtain the measurement value corresponding to the one reference signal resource, respectively. The measurement result obtained is determined as the measurement result corresponding to the reference signal resource subset. That is, the measurement result corresponding to the reference signal resource is obtained based on the QCL information corresponding to the N TCI states.

In step 503, a reference signal resource subset with a measurement result greater than a threshold value is determined as the target reference signal resource subset.

In an embodiment of the present disclosure, the threshold value may be predetermined by the UE.

In another embodiment of the present disclosure, the threshold value may be indicated by the network side device to the UE.

In an embodiment of the present disclosure, one or more target reference signal resource subsets may be determined from one candidate beam reference signal set.

Therefore, the measurement result corresponding to each reference signal resource subset in the candidate beam reference signal set may be determined through step 503.

In step 504, identification information of the target reference signal resource subset is indicated to the network side device.

In an embodiment of the present disclosure, the identification information of the target reference signal resource subset may be an index of the target reference signal resource subset, or an index of one target reference signal resource included in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 6 is a schematic flowchart of a link recovery method provided by another embodiment of the present disclosure, which is applied to a user equipment. As shown in FIG. 6, the link recovery method may include the following steps.

In step 601, a configuration signaling sent by the network side device is obtained. The configuration signaling includes a candidate beam reference signal set, and the candidate beam reference signal set includes at least one reference signal resource subset. The reference signal resource subset includes two or more reference signal resources. Each of the reference signal resources corresponds to one TCI state.

It is noted that when a certain reference signal resource subset includes two or more reference signal resources, one of the reference signal resources only corresponds to one TCI state, and different reference signal resources may correspond to different TCI states.

In step 602, by using the TCI status corresponding to each reference signal resource, a measurement value corresponding to each reference signal resource is obtained to obtain two or more measurement values. According to the two or more measurement values, the measurement result corresponding to the reference signal resource subset is obtained to obtain the measurement result corresponding to each reference signal resource subset in the candidate beam reference signal set.

This step 602 is mainly used to determine a process for determining the measurement results of the reference signal resource subset including two or more reference signal resources.

In an embodiment of the present disclosure, the measurement value corresponding to the reference signal resource may include: radio link quality and/or RSRP and/or RSRQ and/or SINR, etc.

When the measurement values corresponding to the reference signal resources are different, the measurement results corresponding to the reference signal resource subsets are obtained in different ways.

Specifically, in an embodiment of the present disclosure, when the measurement value corresponding to the reference signal resource includes the radio link quality, the RSRQ or the SINR, obtaining the measurement result corresponding to the reference signal resource subset according to two or more measurement values may include: summing the reference signal power measurement values corresponding to the two or more reference signal resources, and considering the interference part other than the two or more reference signal resources to obtain the measurement result of the reference signal resource subset.

In another embodiment of the present disclosure, when the measurement value corresponding to the reference signal resource includes the RSRP, obtaining the measurement result corresponding to the reference signal resource subset according to two or more measurement values may include: summing the two or more measurement values to obtain the measurement result of the reference signal resource subset.

Therefore, the measurement result corresponding to each reference signal resource subset in the candidate beam reference signal set may be determined through step 503.

In step 603, a reference signal resource subset with a measurement result greater than a threshold value is determined as a target reference signal resource subset.

In an embodiment of the present disclosure, the threshold value may be predetermined by the UE.

In another embodiment of the present disclosure, the threshold value may be indicated by the network side device to the UE.

In an embodiment of the present disclosure, one or more target reference signal resource subsets may be determined from one candidate beam reference signal set.

In step 604, identification information of the target reference signal resource subset is indicated to the network side device.

In another embodiment of the present disclosure, the identification information of the target reference signal resource subset may be an index corresponding to the target reference signal resource subset.

In another embodiment of the present disclosure, the identification information of the target reference signal resource subset may be an index corresponding to at least one reference signal resource in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 7 is a schematic flowchart of a link recovery method provided by another embodiment of the present disclosure, which is applied to a user equipment. As shown in FIG. 7, the link recovery method may include the following steps.

In step 701, a configuration signaling sent by the network side device is obtained. The configuration signaling may include a candidate beam reference signal set, the candidate beam reference signal set may include at least one reference signal resource subset, and the reference signal resource subset may include at least one reference signal resource.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 702, a measurement result corresponding to the reference signal resource subset is obtained by a measurement value corresponding to at least one reference signal resource included in the reference signal resource subset, thereby obtaining the measurement result corresponding to each reference signal resource subset in the candidate beam reference signal set.

In an embodiment of the present disclosure, the measurement values corresponding to the reference signal resources may include: radio link quality and/or RSRP and/or RSRQ and/or SINR, etc.

When the measurement values corresponding to the reference signal resources are different, the measurement results corresponding to the reference signal resource subsets are obtained in different ways.

Specifically, in an embodiment of the present disclosure, when the measurement value corresponding to the reference signal resource includes the radio link quality, the RSRQ or the SINR, by using the measurement value corresponding to at least one reference signal resource included in the reference signal resource subset, obtaining the measurement results corresponding to the reference signal resource subset may include: when the reference signal resource subset only includes one reference signal resource, directly determining the measurement value corresponding to the one reference signal resource as the measurement result corresponding to the reference signal resource subset; when the reference signal resource subset includes two or more reference signal resources, summing the reference signal power measurement values corresponding to the two or more reference signal resources, and considering the interference part to be interference other than the above two or more reference signal resources to obtain the measurement results of the reference signal resources subset.

In another embodiment of the present disclosure, when the measurement value corresponding to the reference signal resource includes the RSRP, obtaining the measurement result corresponding to the reference signal resource subset based on two or more measurement values may include: when the reference signal resource subset includes only one reference signal resource, directly determining the measurement value corresponding to the one reference signal resource as the measurement result corresponding to the reference signal resource subset; when the reference signal resource subset includes two or more reference signal resources, summing the measurement values corresponding to the two or more reference signal resource to obtain the measurement result of the reference signal resource subset.

In step 703, a reference signal resource subset with measurement result greater than a threshold value is determined as the target reference signal resource subset.

In an embodiment of the present disclosure, the threshold value may be predetermined by the UE.

In another embodiment of the present disclosure, the threshold value may be indicated by the network side device to the UE.

In an embodiment of the present disclosure, one or more target reference signal resource subsets may be determined from one candidate beam reference signal set.

In step 704, the identification information of the target reference signal resource subset is indicated by using a physical random access channel (PRACH) in a random access process.

In an embodiment of the present disclosure, indicating the identification information of the target reference signal resource subset by using the PRACH in the random access to may include: determining a target synchronization signal block (SSB) corresponding to the target reference signal resource subset, and sending a corresponding random access preamble by using the corresponding PRACH resource. Therefore, after the network side device receives the corresponding random access preamble in a beam direction corresponding to the SSB, the target reference signal resource subset corresponding to the target SSB may be determined, so as to obtain indication information of the target reference signal resource subset. It is noted that the corresponding PRACH resource and/or the corresponding random access preamble may be indicated by the base station or determined by the terminal according to the target SSB.

In an embodiment of the present disclosure, when the reference signal resource subset includes one reference signal resource, the identification information of the target reference signal resource subset may be an index of the target reference signal resource subset, or an index of a target reference signal resource included in the target reference signal resource sub set.

In another embodiment of the present disclosure, when the reference signal resource subset includes a plurality of reference signal resources, the identification information of the target reference signal resource subset may be an index corresponding to the target reference signal resource subset.

In another embodiment of the present disclosure, when the reference signal resource subset includes a plurality of reference signal resources, the identification information of the target reference signal resource subset may be an index corresponding to at least one reference signal resource in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 8 is a schematic flowchart of a link recovery method provided by another embodiment of the present disclosure, which is applied to a user equipment. As shown in FIG. 8, the link recovery method may include the following steps.

In step 801, a configuration signaling sent by the network side device is obtained. The configuration signaling may include a candidate beam reference signal set, the candidate beam reference signal set may include at least one reference signal resource subset, and the reference signal resource subset may include at least reference signal resource.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 802, a measurement result corresponding to the reference signal resource subset is obtained by a measurement value corresponding to at least one reference signal resource included in the reference signal resource subset, thereby obtaining the measurement result corresponding to each reference signal resource subset in the candidate beam reference signal set.

In an embodiment of the present disclosure, the measurement values corresponding to the reference signal resources may include: radio link quality and/or RSRP and/or RSRQ and/or SINR, etc.

When the measurement values corresponding to the reference signal resources are different, the measurement results corresponding to the reference signal resource subsets are obtained in different ways.

Specifically, in an embodiment of the present disclosure, when the measurement value corresponding to the reference signal resource includes the radio link quality or the RSRQ or the SINR, by using the measurement value corresponding to at least one reference signal resource included in the reference signal resource subset, obtaining the measurement results corresponding to the reference signal resource subset may include: when the reference signal resource subset only includes one reference signal resource, directly determining the measurement value corresponding to the one reference signal resource as the measurement result corresponding to the reference signal resource subset; when the reference signal resource subset includes two or more reference signal resources, summing the reference signal power measurement values corresponding to the two or more reference signal resources, and considering the interference part to be interference other than the above two or more reference signal resources to obtain the measurement results of the reference signal resources subset.

In another embodiment of the present disclosure, when the measurement value corresponding to the reference signal resource includes the RSRP, obtaining the measurement value corresponding to the reference signal resource subset by the measurement value corresponding to at least one reference signal resource included in the reference signal resource subset may include: when the reference signal resource subset includes only one reference signal resource, directly determining the measurement value corresponding to the one reference signal resource as the measurement result corresponding to the reference signal resource subset; when the reference signal resource subset includes two or more reference signal resources, summing the measurement values corresponding to the two or more reference signal resources to obtain the measurement result of the reference signal resource subset.

In step 803, a reference signal resource subset with a measurement result greater than a threshold value is determined as the target reference signal resource subset.

In an embodiment of the present disclosure, the threshold value may be predetermined by the UE.

In another embodiment of the present disclosure, the threshold value may be indicated by the network side device to the UE.

In an embodiment of the present disclosure, one or more target reference signal resource subsets may be determined from one candidate beam reference signal set.

In step 804, identification information of the target reference signal resource subset is sent via a physical uplink shared channel (PUSCH).

In an embodiment of the present disclosure, a process of sending the identification information of the target reference signal resource subset via the PUSCH may include: sending a scheduling request (SR) to a network side device, so that the network side device schedules the PUSCH resources for the UE in response to the SR. The UE obtains the PUSCH resources scheduled by the network side device, and sends the identification information of the target reference signal resource subset via the PUSCH scheduled by the network side device.

In an embodiment of the present disclosure, the identification information of the target reference signal resource subset may also be sent via the PUSCH MAC CE.

In an embodiment of the present disclosure, when the reference signal resource subset includes one reference signal resource, the identification information of the target reference signal resource subset may be an index of the target reference signal resource subset, or an index of a target reference signal resource included in the target reference signal resource sub set.

In another embodiment of the present disclosure, when the reference signal resource subset includes a plurality of reference signal resources, the identification information of the target reference signal resource subset may be an index corresponding to the target reference signal resource subset.

In another embodiment of the present disclosure, when the reference signal resource subset includes a plurality of reference signal resources, the identification information of the target reference signal resource subset may be an index corresponding to at least one reference signal resource in the target reference signal resource subset.

In addition, in an embodiment of the present disclosure, after the UE indicates the identification information of the target reference signal resource subset to the network side device, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 9 is a schematic flowchart of a link recovery method provided by another embodiment of the present disclosure, which is applied to a network side device. As shown in FIG. 9, the link recovery method may include the following steps.

In step 901, a configuration signaling is sent to the UE. The configuration signaling may include a candidate beam reference signal set, the candidate beam reference signal set may include at least one reference signal resource subset, and the reference signal resource subset may include at least one reference signal resource.

In an embodiment of the present disclosure, the network side device may be configured with the candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In an embodiment of the present disclosure, the reference signal resource subset may include one reference signal resource. When the reference signal resource subset only includes one reference signal resource, the reference signal resource subset may be considered to be the same as the reference signal resource. That is, the candidate reference signal resource set may include at least one reference signal resource.

In another embodiment of the present disclosure, the reference signal resource subset may include a plurality of reference signal resources. The plurality of reference signal resources have a certain relationship. For example, the plurality of reference signal resources belong to a reference signal resource subset, or the plurality of reference signal resources are configured as the plurality of reference signal resources with an associated relationship. The association relationships include, but are not limited to a pair relationship, a group relationship, or a link relationship.

In step 902, identification information of the target reference signal resource subset indicated by the UE is obtained.

In an embodiment of the present disclosure, the network side device may obtain identification information of one or more target reference signal resource subsets.

In an embodiment of the present disclosure, when the reference signal resource subset includes one reference signal resource, the identification information of the target reference signal resource subset may be an index of the target reference signal resource subset, or an index of a target reference signal resource included in the target reference signal resource sub set.

In another embodiment of the present disclosure, when the reference signal resource subset includes a plurality of reference signal resources, the identification information of the target reference signal resource subset may be an index corresponding to the target reference signal resource subset.

In another embodiment of the present disclosure, when the reference signal resource subset includes a plurality of reference signal resources, the identification information of the target reference signal resource subset may be an index corresponding to at least one reference signal resource in the target reference signal resource subset.

In addition, in an embodiment of the present disclosure, after obtaining the identification information of the target reference signal resource subset indicated by the UE, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 10 is a schematic flowchart of a link recovery method provided by another embodiment of the present disclosure, which is applied to a network side device. As shown in FIG. 10, the link recovery method may include the following steps.

In step 1001, a configuration signaling is sent to a UE. The configuration signaling may include a candidate beam reference signal set, and the candidate reference signal resource set may include at least one reference signal resource, and the at least one reference signal resource is configured with one or more TCI status.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 1002, identification information of a target reference signal resource indicated by the UE is obtained.

In an embodiment of the present disclosure, the network side device may obtain identification information of one or more target reference signal resources.

In an embodiment of the present disclosure, the identification information of the target reference signal resource may be an index corresponding to the target reference signal resource.

In addition, in an embodiment of the present disclosure, after obtaining the identification information of the target reference signal resource subset indicated by the UE, the network side device determines at least one new beam according to at least one reference signal resource included in the target reference signal resource subset, and performs the link recovery according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 11 is a schematic flowchart of a link recovery method provided by another embodiment of the present disclosure, which is applied to a network side device. As shown in FIG. 11, the link recovery method may include the following steps.

In step 1101, a configuration signaling is sent to the UE. The configuration signaling may include a candidate beam reference signal set, the candidate beam reference signal set may include at least one reference signal resource subset, and the reference signal resource subset may include at least one reference signal resource.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 1102, identification information of the target reference signal resource subset is determined according to a physical random access channel (PRACH) in a random access process.

In an embodiment of the present disclosure, the network side device may receive the identification information of one or more target reference signal resource subsets.

In an embodiment of the present disclosure, determining the identification information of the target reference signal resource subset according to the PRACH in the random access process may include: after the base station receives a relevant signaling (such as, a random access preamble) sent using the corresponding PRACH resources in the random access process, a target SSB corresponding to the relevant signaling may be determined, and the target reference signal resource subset corresponding to the target SSB may be determined, thereby obtaining the identification information of the target reference signal resource subset. It is noted that the corresponding PRACH resource and/or the corresponding random access preamble may be instructed by the base station or determined by the terminal according to the target SSB.

In an embodiment of the present disclosure, when the reference signal resource subset includes one reference signal resource, the identification information of the target reference signal resource subset may be an index of the target reference signal resource subset, or an index of one target reference signal resource included in the target reference signal resource sub set.

In another embodiment of the present disclosure, when the reference signal resource subset includes a plurality of reference signal resources, the identification information of the target reference signal resource subset may be an index corresponding to the target reference signal resource subset.

In another embodiment of the present disclosure, when the reference signal resource subset includes a plurality of reference signal resources, the identification information of the target reference signal resource subset may be an index corresponding to at least one reference signal resource in the target reference signal resource subset.

In addition, in one embodiment of the present disclosure, after obtaining the identification information of the target reference signal resource subset indicated by the UE, the network side device determines at least one new beam according to at least one reference signal resource included in the target reference signal resource subset, and link recovery is implemented according to the at least one new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 12 is a schematic flowchart of a link recovery method provided by another embodiment of the present disclosure, which is applied to a network side device. As shown in FIG. 12, the link recovery method may include the following steps.

In step 1201, a configuration signaling is sent to the UE. The configuration signaling may include a candidate beam reference signal set, the candidate beam reference signal set may include at least one reference signal resource subset, and the reference signal resource subset may include at least one reference signal resource.

In an embodiment of the present disclosure, the network side device may be configured with a set of candidate beam reference signals for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 1202, identification information of the target reference signal resource subset is obtained via a physical uplink shared channel (PUSCH).

In an embodiment of the present disclosure, the network side device may receive the identification information of one or more target reference signal resource subsets.

In an embodiment of the present disclosure, a process for obtaining the identification information of the target reference signal resource subset via the PUSCH may include: in response to the SR sent by the UE, the network side device schedules the PUSCH resources for the UE, and receives the identification information of the target reference signal resources set sent by the UE via the PUSCH scheduled by the network side device.

In an embodiment of the present disclosure, the identification information of the target reference signal resource subset may also be received via the PUSCH-MAC CE.

In an embodiment of the present disclosure, when the reference signal resource subset includes one reference signal resource, the identification information of the target reference signal resource subset may be an index of the target reference signal resource subset, or an index of a target reference signal resource included in the target reference signal resource.

In another embodiment of the present disclosure, when the reference signal resource subset includes a plurality of reference signal resources, the identification information of the target reference signal resource subset may be an index corresponding to the target reference signal resource subset.

In another embodiment of the present disclosure, when the reference signal resource subset includes a plurality of reference signal resources, the identification information of the target reference signal resource subset may be an index corresponding to at least one reference signal resource in the target reference signal resource subset.

In addition, in an embodiment of the present disclosure, after obtaining the identification information of the target reference signal resource subset indicated by the UE, the network side device determines at least one new beam according to at least one reference signal resource included in the target reference signal resource subset, and implement the link recovery according to the at least new beam.

Determining the new beam may include determining at least one of the following pieces of information: quasi co-location parameters, spatial filters, spatial setting, spatial Rx parameters and spatial relation Info.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

FIG. 13 is a schematic flowchart of a link recovery method provided by another embodiment of the present disclosure, which is applied to a network side device. As shown in FIG. 13, the link recovery method may include the following steps.

In step 1301, a configuration signaling is sent to the UE. The configuration signaling may include a candidate beam reference signal set, the candidate beam reference signal set may include at least one reference signal resource subset, and the reference signal resource subset may include at least one reference signal resource.

In an embodiment of the present disclosure, the network side device may be configured with a candidate beam reference signal set for each UE, so as to provide candidate beams for the UE when the beam link between the UE and the network side device fails. In an embodiment of the present disclosure, the candidate beam reference signal sets corresponding to different UEs may be the same. In another embodiment of the present disclosure, the candidate beam reference signal sets corresponding to different UEs may be different.

In step 1302, identification information of a target reference signal resource subset indicated by the UE is obtained.

In an embodiment of the present disclosure, the network side device may obtain the identification information of one or more target reference signal resource subsets.

In an embodiment of the present disclosure, when the reference signal resource subset includes one reference signal resource, the identification information of the target reference signal resource subset may be an index of the target reference signal resource subset, or an index of a target reference signal resource included in the target reference signal resource.

In another embodiment of the present disclosure, when the reference signal resource subset includes a plurality of reference signal resources, the identification information of the target reference signal resource subset may be an index corresponding to the target reference signal resource subset.

In another embodiment of the present disclosure, when the reference signal resource subset includes a plurality of reference signal resources, the identification information of the target reference signal resource subset may be an index corresponding to at least one reference signal resource in the target reference signal resource subset.

In addition, in an embodiment of the present disclosure, after obtaining the identification information of the target reference signal resource subset indicated by the UE, the network side device determines at least one new beam according to at least one reference signal resource included in the target reference signal resource subset, and implement the link recovery according to the at least new beam.

Determining the new beam may include determining at least one of the following pieces of information: quasi co-location parameters, spatial filters, spatial setting, spatial Rx parameters and spatial relation Info.

In step 1303, at least one of a new beam and a new quasi-co-location (QCL) parameter is determined according to the identification information of the target reference signal resource subset to obtain a determination result, and communicating with the UE based on the determination result.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the link recovery, and reduces the delay of the link recovery.

In addition, it is noted that the link recovery method provided by embodiments of the present disclosure is a recovery method executed after a beam link failure is detected. For example, when the UE detects a beam link failure, an operation of "determining the target reference signal resource subset from the candidate beam reference signal set" may be performed to determine a new beam for link recovery.

FIG. 14 is a schematic diagram of a link recovery apparatus 1400 provided by an embodiment of the present disclosure, which is applied to a user equipment. As shown in FIG. 14, the link recovery apparatus 1400 may include:

an obtaining module 1401 configured to obtain a configuration signaling sent by a network side device, in which the configuration signaling includes a candidate beam reference signal set, the candidate beam reference signal set includes at least one reference signal resource subset, and the reference signal resource subset includes at least one reference signal resource;

a determining module 1402 configured to determine a target reference signal resource subset from the candidate beam reference signal set;

an indicating module 1403 configured to indicate identification information of the target reference signal resource subset to the network side device.

It could be seen that in the link recovery method provided in embodiments of the present disclosure, the network side device may determine one or more new beams based on the target reference signal resource subset sent by the link recovery apparatus to implement link recovery, and thus may be applicable to multi-TRP scenarios, which has a wide range of applications, improves the success rate of the link recovery, and reduces the delay of the beam link recovery.

Determining the new beam may include determining at least one of the following pieces of information: quasi co-location parameters, spatial filters, spatial setting, spatial Rx parameters and spatial relation Info.

In an embodiment of the present disclosure, the determining module 1402 is further used to:

obtain a measurement result corresponding to the reference signal resource subset;

determine the reference signal resource subset with a measurement result greater than a threshold value as the target reference signal resource subset.

Further, in an embodiment of the present disclosure, the determining module 1402 is further configured to:

obtain the measurement result corresponding to the reference signal resource subset by a measurement value corresponding to at least one reference signal resource included in the reference signal resource subset.

Further, in an embodiment of the present disclosure, the reference signal resource subset includes one reference signal resource. The reference signal resource corresponds to N transmission configuration indication (TCI) states, where N is an integer greater than 0.

Further, in an embodiment of the present disclosure, the determining module 1402 is further configured to:

determine as the measurement result corresponding to the reference signal resource subset a measurement value corresponding to the reference signal resource obtained by using the N TCI states.

Further, in an embodiment of the present disclosure, the reference signal resource subset includes two or more reference signal resources. Each of the reference signal resources corresponds to one TCI state.

Further, in an embodiment of the present disclosure, the determining module 1402 is further configured to:

obtain the measurement value corresponding to each of the reference signal resources by using the TCI state corresponding to each of the reference signal resources correspondingly, so as to obtain two or more measurement values; obtain the measurement result corresponding to the reference signal resource subset according to the two or more measurement values.

Further, in an embodiment of the present disclosure, the indicating module 1403 is further configured to:

indicate the identification information of the target reference signal resource subset by using a physical random access channel (PRACH) in a random access process.

Further, in an embodiment of the present disclosure, the indicating module 1403 is further configured to:

send the identification information of the target reference signal resource subset via a physical uplink shared channel (PUSCH).

FIG. 15 is a schematic diagram of a link recovery apparatus 1500 provided by another embodiment of the present disclosure, which is applied to a network side device. As shown in FIG. 15, the link recovery apparatus 1500 may include:

a sending module 1501 configured to send a configuration signaling to a user equipment (UE), in which the configuration signaling includes a candidate beam reference signal set, the candidate beam reference signal set includes at least one reference signal resource subset, and the reference signal resource subset includes at least one reference signal resource;

an obtaining module 1502 configured to obtain identification information of a target reference signal resource subset indicated by the UE.

It could be seen that in the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of the beam link recovery, and reduces the delay of the beam link recovery.

In an embodiment of the present disclosure, the obtaining module 1502 is further configured to:

determine the identification information of the target reference signal resource subset according to a physical random access channel (PRACH) in a random access process.

Further, in an embodiment of the present disclosure, the obtaining module 1502 is further configured to:

obtain the identification information of the target reference signal resource subset via a physical uplink shared channel (PUSCH).

Further, in an embodiment of the present disclosure, the link recovery apparatus 1500 is further configured to:

determine at least one of a new beam or a new quasi-co-location (QCL) parameter according to the identification information of the target reference signal resource subset to obtain a determination result, and communicated with the UE based on the determination result.

Determining the new beam may include determining at least one of the following pieces of information: quasi co-location parameters, spatial filters, spatial setting, spatial Rx parameters and spatial relation Info.

In order to implement the above-mentioned embodiments, the present disclosure also provides a computer storage medium.

The computer storage medium provided by embodiments of the present disclosure stores executable programs. After the executable programs are executed by the processor, the link recovery method as shown in any one of FIGS. 1 to 8 or FIGS. 9 to 13 may be implemented.

In order to implement the above-mentioned embodiments, the present disclosure also provides a computer program product, including a computer program that, when executed by a processor, causes the link recovery method as shown in any one of FIGS. 1 to 8 or FIGS. 9 to 13 to be implemented.

In addition, in order to implement the above-mentioned embodiments, the present disclosure also provides a computer program that, when executed by a processor, causes the link recovery method as shown in any one of FIGS. 1 to 8 or FIGS. 9 to 13 to be implemented.

In this way, with the link recovery method provided in embodiments of the present disclosure, the network side device may determine one or more new beams based on the target reference signal resource subset sent by the UE to implement link recovery, and thus may be applicable to multi-TRP scenarios, which has a wide range of applications, improves the success rate of link recovery, and reduce the delay of link recovery.

Figure 16:
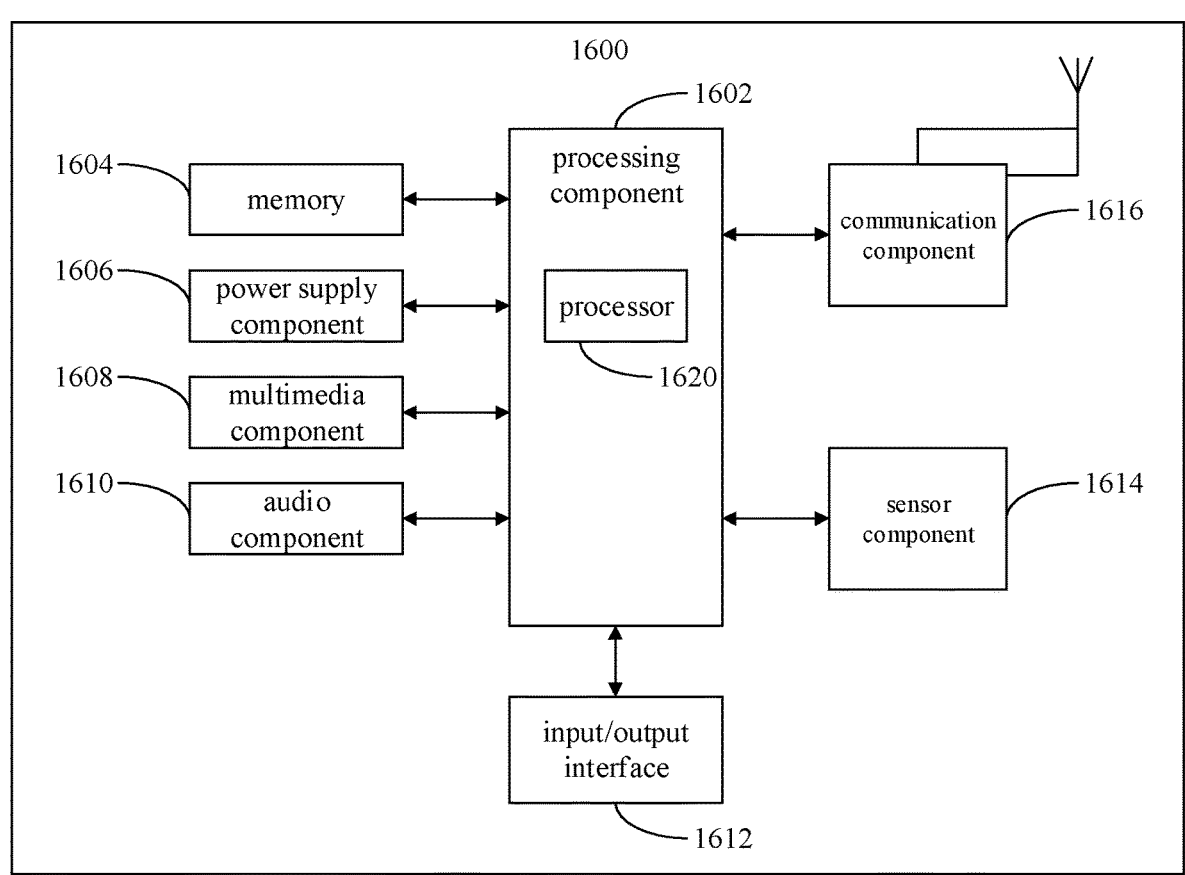
FIG. 16 is a block diagram of a user equipment provided by an embodiment of the present disclosure.

FIG. 16 is a block diagram of a user equipment (UE) 1600 provided by an embodiment of the present disclosure. For example, the UE 1600 may be a mobile phone, a computer, a digital broadcast terminal device, a messaging device, a game console, a tablet device, a medical device, a fitness device, a personal digital assistant, and the like.

Referring to FIG. 16, the UE 1600 may include at least one of the following components: a processing component 1602, a memory 1604, a power supply component 1606, a multimedia component 1608, an audio component 1610, an input/output (I/O) interface 1612, a sensor component 1616, and a communication component 1616.

The processing component 1602 generally controls the overall operations of the UE 1600, such as the operations associated with display, telephone calls, data communications, camera operations, and recording operations. The processing component 1602 may include at least one processor 1620 to execute instructions to complete all or part of the steps of the above-mentioned method. Additionally, the processing component 1602 may include at least one modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operation of the UE 1600. Examples of such data include instructions for any application or method operated on the UE 1600, contact data, phonebook data, messages, pictures, videos, and the like. The memory 1604 may be implemented by using any type of volatile or non-volatile storage device, or a combination thereof, such as a static random access memory (SRAM), an electrically erasable programmable read-only memory (EEPROM), an erasable programmable read only memory (EEPROM), a programmable read only memory (EPROM), a programmable read only memory (PROM), a read-only memory (ROM), a magnetic memory, a flash memory, a magnetic or an optical disk.

The power supply component 1606 provides power to various components of the UE 1600. The power component 1606 may include a power management system, at least one power sources, and any other components associated with generation, management, and distribution of power to the UE 1600.

The multimedia component 1608 includes a screen that provides an output interface between the UE 1600 and the user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, swipes, and gestures on the touch panel. The touch sensor may not only sense a boundary of a touch or a swipe action, but also sense awake time and a pressure related to the touch or swipe operation. In some embodiments, the multimedia component 1608 includes a front camera and/or a rear-facing camera. The front camera and/or the rear camera may receive an external multimedia datum while the UE 1600 is in an operation mode, such as a photographing mode or a video mode. Each of the front camera and the rear camera may be a fixed optical lens system or have focal and optical zoom capability.

The audio component 1610 is configured to output and/or input audio signals. For example, the audio component 1610 includes a microphone (MIC) configured to receive an external audio signal when the UE 1600 is in an operation mode, such as a call mode, a recording mode, and a voice recognition mode. The received audio signal may be further stored in the memory 1604 or transmitted via a communication component 1616. In some embodiments, the audio component 1610 further includes a speaker to output audio signals.

The I/O interface 1612 provides an interface between the processing component 1602 and peripheral interface modules, such as keyboards, click wheels, buttons, and the like. These buttons may include, but are not limited to, a home button, a volume button, a starting button, and a locking button.

The sensor component 1614 includes at least one sensor to provide status assessments of various aspects of the UE 1600. For example, the sensor component 1614 may detect an open/closed status of the UE 1600, relative positioning of components, e.g., the display and the keypad, of the UE 1600, a change in position of the UE 1600 or a component of the UE 1600, a presence or absence of user contact with the UE 1600, an orientation or an acceleration/deceleration of the UE 1600, and a change in temperature of the UE 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an acceleration sensor, a gyroscope sensor, a magnetic sensor, a pressure sensor or a temperature sensor.

The communication component 1616 is configured to facilitate communication, wired or wireless, between the UE 1600 and other devices. The UE 1600 may access a wireless network based on a communication standard, such as WiFi, 2G or 3G, or a combination thereof. In illustrative embodiments, the communication component 1616 receives a broadcast signal or broadcast related information from an external broadcast management system via a broadcast channel. In illustrative embodiments, the communication component 1616 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the UE 1600 may be configured by at least one application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, for performing the above-described method.

Figure 17:
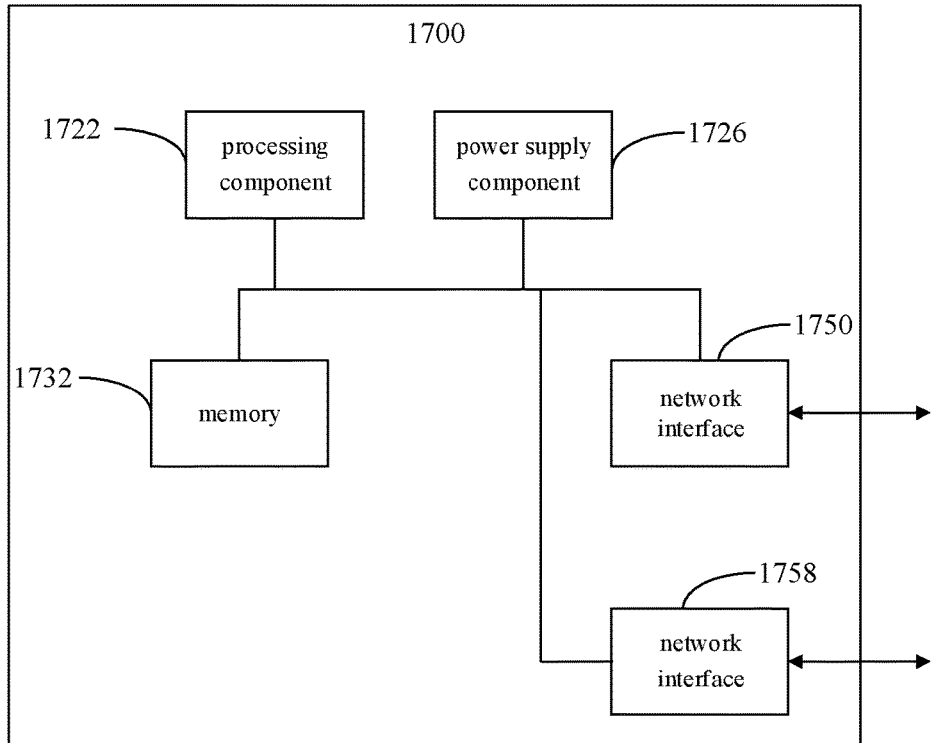
FIG. 17 is a block diagram of a network side device provided by an embodiment of the present disclosure.

FIG. 17 is a schematic diagram of a network side device (such as a base station) 1700 provided by an embodiment of the present application. For example, the base station 1700 may be provided as a base station. Referring to FIG. 17, the base station 1700 includes a processing component 1722, which further includes at least one processor, and memory resources represented by a memory 1732 for storing instructions executable by the processing component 1722, such as application programs. The application program stored in the memory 1732 may include one or more modules, each corresponding to a set of instructions. In addition, the processing component 1722 is configured to execute instructions to perform any one of the above-mentioned methods applied to the base station, for example, the method shown in FIG. 1.

The base station 1700 may also include a power supply component 1726 configured to perform power management of the base station 1700, a wired or wireless network interface 1750 configured to connect the base station 1700 to a network, and an input/output (I/O) interface 1758. The base station 1700 may operate based on an operating system stored in the memory 1732, such as Windows Server™, Mac OS X™, Unix™, Linux™, FreeBSD™ or the like.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from embodiments of the present disclosure as come within known or customary practice in the art. It is intended that the specification and the examples be considered as illustrative only, with a true scope and spirit of the embodiments of the present disclosure being indicated by the following claims.

It is appreciated that embodiments of the present disclosure are not limited to the exact construction that has been described above and illustrated in the accompanying drawings, and that various modifications and changes may be made without departing from the scope thereof. It is intended that the scope of embodiments of the present disclosure only be limited by the appended claims.

What is claimed is:

1. A link recovery method, applied to multi-TRP scenarios, and performed by a user equipment (UE), comprising:

obtaining a configuration signaling sent by a network side device, wherein the configuration signaling comprises a candidate beam reference signal set, the candidate beam reference signal set comprises at least one reference signal resource subset, and the reference signal resource subset comprises at least one reference signal resource;

determining a target reference signal resource subset from the candidate beam reference signal set, wherein the target reference signal resource subset comprises at least one reference signal resource;

indicating identification information of the target reference signal resource subset to the network side device, wherein the identification information of the target reference signal resource subset is used for link recovery;

wherein determining the target reference signal resource subset from the candidate beam reference signal set comprises:

obtaining a measurement result corresponding to the reference signal resource subset in the candidate beam reference signal set;

determining the reference signal resource subset with a
measurement result greater than a threshold value as
the target reference signal resource subset.

2. The method according to claim 1, wherein obtaining the
measurement result corresponding to the reference signal
resource subset comprises:
obtaining the measurement result corresponding to the
reference signal resource subset by at least one mea-
surement value corresponding to a reference signal
resource within the reference signal resource subset.

3. The method according to claim 1, wherein the reference
signal resource subset comprises one reference signal
resource; wherein the reference signal resource corresponds
to N transmission configuration indication (TCI) states,
where N is an integer greater than 0.

4. The method according to claim 3, wherein obtaining the
measurement result corresponding to the reference signal
resource subset comprises:
determining as the measurement result corresponding to
the reference signal resource subset a measurement
value corresponding to the reference signal resource
obtained by using the N TCI states.

5. The method according to claim 1, wherein the reference
signal resource subset comprises two or more reference
signal resources; wherein each of the reference signal
resources corresponds to one TCI state.

6. The method according to claim 5, wherein obtaining the
measurement result corresponding to the reference signal
resource subset comprises:
obtaining the measurement value corresponding to each
of the reference signal resources by using the TCI state
corresponding to each of the reference signal resources
correspondingly, to obtain two or more measurement
values;
obtaining the measurement result corresponding to the
reference signal resource subset according to the two or
more measurement values.

7. The method according to claim 1, wherein indicating
the identification information of the target reference signal
resource subset to the network side device comprises:
indicating the identification information of the target
reference signal resource subset by using a physical
random access channel (PRACH) in a random access
process.

8. The method according to claim 1, wherein indicating
the identification information of the target reference signal
resource subset to the network side device comprises:
sending the identification information of the target refer-
ence signal resource subset via a physical uplink shared
channel (PUSCH).

9. A link recovery method, applied to multi-TRP sce-
narios, and performed by a network side device, comprising:
sending a configuration signaling to a user equipment
(UE), to enable the UE to obtain a measurement result
corresponding to a reference signal resource subset in
a candidate beam reference signal set, and to determine
the reference signal resource subset with a measure-
ment result greater than a threshold value as a target
reference signal resource subset, wherein the configu-
ration signaling comprises the candidate beam refer-
ence signal set, the candidate beam reference signal set
comprises at least one reference signal resource subset,
and the reference signal resource subset comprises at
least one reference signal resource;
obtaining identification information of the target reference
signal resource subset indicated by the UE; wherein the
target reference signal resource subset comprises at least one reference signal resource, and the identifica-
tion information of the target reference signal resource
subset is used for link recovery.

10. The method according to claim 9, wherein obtaining
the identification information of the target reference signal
resource subset indicated by the UE comprises:
determining the identification information of the target
reference signal resource subset according to a physical
random access channel (PRACH) in a random access
process.

11. The method according to claim 9, wherein obtaining
the identification information of the target reference signal
resource subset indicated by the UE comprises:
obtaining the identification information of the target ref-
erence signal resource subset via a physical uplink
shared channel (PUSCH).

12. The method according to claim 9, further comprising:
determining at least one of a new beam or a new quasi-
co-location (QCL) parameter according to the identi-
fication information of the target reference signal
resource subset to obtain a determination result, and
communicating with the UE based on the determination
result.

13. A user equipment, comprising:
a transceiver;
a memory;
a processor connected to the transceiver and the memory
respectively and configured to control transmission and
reception of a wireless signal of the transceiver and
implement following operations by executing com-
puter-executable instructions on the memory:
obtaining a configuration signaling sent by a network side
device, wherein the configuration signaling comprises
a candidate beam reference signal set, the candidate
beam reference signal set comprises at least one refer-
ence signal resource subset, and the reference signal
resource subset comprises at least one reference signal
resource;
determining a target reference signal resource subset from
the candidate beam reference signal set, wherein the
target reference signal resource subset comprises at
least one reference signal resource;
indicating identification information of the target refer-
ence signal resource subset to the network side device,
wherein the identification information of the target
reference signal resource subset is used for link recov-
ery;
wherein the processor is further configured to implement
following operations:
determining the target reference signal resource subset
from the candidate beam reference signal set com-
prises:
obtaining a measurement result corresponding to the
reference signal resource subset in the candidate beam
reference signal set;
determining the reference signal resource subset with a
measurement result greater than a threshold value as
the target reference signal resource subset.

14. The user equipment according to claim 13, wherein
determining the target reference signal resource subset from
the candidate beam reference signal set comprises:
obtaining a measurement result corresponding to the
reference signal resource subset in the candidate beam
reference signal set;
determining the reference signal resource subset with a
measurement result greater than a threshold value as
the target reference signal resource subset.

15. The user equipment according to claim 14, wherein obtaining the measurement result corresponding to the reference signal resource subset comprises:

obtaining the measurement result corresponding to the reference signal resource subset by at least one measurement value corresponding to a reference signal resource comprised in the reference signal resource subset.

16. The user equipment according to claim 14, wherein the reference signal resource subset comprises one reference signal resource; wherein the reference signal resource corresponds to N transmission configuration indication (TCI) states, where N is an integer greater than 0.

17. The user equipment according to claim 16, wherein obtaining the measurement result corresponding to the reference signal resource subset comprises:

determining as the measurement result corresponding to the reference signal resource subset a measurement value corresponding to the reference signal resource obtained by using the N TCI states.

18. The user equipment according to claim 14, wherein the reference signal resource subset comprises two or more reference signal resources; wherein each of the reference signal resources corresponds to one TCI state.

19. The user equipment according to claim 18, wherein obtaining the measurement result corresponding to the reference signal resource subset comprises:

obtaining the measurement value corresponding to each of the reference signal resources by using the TCI state corresponding to each of the reference signal resources correspondingly, to obtain two or more measurement values;

obtaining the measurement result corresponding to the reference signal resource subset according to the two or more measurement values.

* * * * *